US011775640B1

(12) United States Patent
Sathe et al.

(10) Patent No.: US 11,775,640 B1
(45) Date of Patent: Oct. 3, 2023

(54) RESOURCE UTILIZATION-BASED MALICIOUS TASK DETECTION IN AN ON-DEMAND CODE EXECUTION SYSTEM

(71) Applicant: Amazon Technologies, Inc., Seattle, WA (US)

(72) Inventors: Mihir Sathe, Seattle, WA (US); Niall Mullen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 787 days.

(21) Appl. No.: 16/835,166

(22) Filed: Mar. 30, 2020

(51) Int. Cl.
*G06F 21/54* (2013.01)
*G06F 21/56* (2013.01)
*G06F 21/55* (2013.01)
*G06F 9/50* (2006.01)

(52) U.S. Cl.
CPC ............ *G06F 21/566* (2013.01); *G06F 21/54* (2013.01); *G06F 21/552* (2013.01); *G06F 9/5005* (2013.01)

(58) Field of Classification Search
CPC ....... G06F 21/566; G06F 21/54; G06F 21/552
See application file for complete search history.

(56) References Cited

U.S. PATENT DOCUMENTS

| 4,949,254 | A | 8/1990 | Shorter |
| 5,283,888 | A | 2/1994 | Dao et al. |
| 5,970,488 | A | 10/1999 | Crowe et al. |
| 6,385,636 | B1 | 5/2002 | Suzuki |

(Continued)

FOREIGN PATENT DOCUMENTS

| EP | 2663052 A1 | 11/2013 |
| JP | 2002287974 A | 10/2002 |

(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

(Continued)

*Primary Examiner* — Paul E Callahan
(74) *Attorney, Agent, or Firm* — Knobbe, Martens, Olson & Bear LLP

(57) ABSTRACT

Systems and methods are described for detecting and preventing execution of malware on an on-demand code execution system. An on-demand code execution system may execute user-submitted code on virtual machine instances, which may be provisioned with various computing resources (memory, storage, processors, network bandwidth, etc.). These resources may be utilized in varying amounts or at varying rates during execution of the user-submitted code. The user-submitted code may also be unavailable for inspection for security or other reasons. A malware detection system may thus identify user-submitted code that corresponds to malware by monitoring resource utilization during execution of the code and generating a resource utilization signature, which enables comparison between the signature of the user-submitted code and resource utilization signatures of codes previously identified as malware. The malware detection system may then take actions such as notifying the user who requested execution or preventing execution of the user-submitted code.

19 Claims, 5 Drawing Sheets

(56) References Cited

U.S. PATENT DOCUMENTS

| | | |
|---|---|---|
| 6,463,509 B1 | 10/2002 | Teoman et al. |
| 6,501,736 B1 | 12/2002 | Smolik et al. |
| 6,523,035 B1 | 2/2003 | Fleming et al. |
| 6,708,276 B1 | 3/2004 | Yarsa et al. |
| 7,036,121 B1 | 4/2006 | Casabona et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,566,835 B2 | 10/2013 | Wang et al. |
| 8,613,070 B1 | 12/2013 | Borzycki et al. |
| 8,631,130 B2 | 1/2014 | Jackson |
| 8,677,359 B1 | 3/2014 | Gavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,162,672 B2 | 12/2018 | Wagner et al. |
| 10,162,688 B2 | 12/2018 | Wagner |
| 10,203,990 B2 | 2/2019 | Wagner et al. |
| 10,248,467 B2 | 4/2019 | Wisniewski et al. |
| 10,277,708 B2 | 4/2019 | Wagner et al. |
| 10,303,492 B1 | 5/2019 | Wagner et al. |
| 10,353,678 B1 | 7/2019 | Wagner |
| 10,353,746 B2 | 7/2019 | Reque et al. |
| 10,365,985 B2 | 7/2019 | Wagner |
| 10,387,177 B2 | 8/2019 | Wagner et al. |
| 10,402,231 B2 | 9/2019 | Marriner et al. |
| 10,437,629 B2 | 10/2019 | Wagner et al. |
| 10,445,140 B1 | 10/2019 | Sagar et al. |
| 10,528,390 B2 | 1/2020 | Brooker et al. |
| 10,552,193 B2 | 2/2020 | Wagner et al. |
| 10,564,946 B1 | 2/2020 | Wagner et al. |
| 10,572,375 B1 | 2/2020 | Wagner |

(56) References Cited

U.S. PATENT DOCUMENTS

| | | |
|---|---|---|
| 10,592,269 B2 | 3/2020 | Wagner et al. |
| 10,623,476 B2 | 4/2020 | Thompson |
| 10,649,749 B1 | 5/2020 | Brooker et al. |
| 10,691,498 B2 | 6/2020 | Wagner |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0191795 A1 | 10/2003 | Bernardin et al. |
| 2003/0229794 A1 | 12/2003 | James, II et al. |
| 2004/0003087 A1 | 1/2004 | Chambliss et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0033085 A1 | 2/2007 | Johnson |
| 2007/0094396 A1 | 4/2007 | Takano et al. |
| 2007/0130341 A1 | 6/2007 | Ma |
| 2007/0174419 A1 | 7/2007 | O'Connell et al. |
| 2007/0192082 A1 | 8/2007 | Gaos et al. |
| 2007/0199000 A1 | 8/2007 | Shekhel et al. |
| 2007/0220009 A1 | 9/2007 | Morris et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0005581 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2010/0312871 A1 | 12/2010 | Desantis et al. |
| 2010/0325727 A1 | 12/2010 | Neystadt et al. |
| 2011/0010722 A1 | 1/2011 | Matsuyama |
| 2011/0029970 A1 | 2/2011 | Arasaratnam |
| 2011/0029984 A1 | 2/2011 | Norman et al. |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0192184 A1 | 7/2012 | Burckart et al. |
| 2012/0197795 A1 | 8/2012 | Campbell et al. |

(56) References Cited

U.S. PATENT DOCUMENTS

| | | |
|---|---|---|
| 2012/0197958 A1 | 8/2012 | Nightingale et al. |
| 2012/0198442 A1 | 8/2012 | Kashyap et al. |
| 2012/0222038 A1 | 8/2012 | Katragadda et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061220 A1 | 3/2013 | Gnanasambandam et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0152200 A1* | 6/2013 | Alme .................. H04L 63/145 726/24 |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0022771 A1 | 8/2013 | Barak et al. |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0311650 A1 | 11/2013 | Brandwine et al. |
| 2013/0326506 A1 | 12/2013 | McGrath et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068611 A1 | 3/2014 | McGrath et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0229221 A1 | 8/2014 | Shih et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0344457 A1 | 11/2014 | Bruno, Jr. et al. |
| 2014/0344736 A1 | 11/2014 | Ryman et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067830 A1 | 3/2015 | Johansson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0134626 A1 | 5/2015 | Theimer et al. |
| 2015/0135287 A1 | 5/2015 | Medeiros et al. |
| 2015/0142952 A1 | 5/2015 | Bragstad et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0324229 A1 | 11/2015 | Valine |
| 2015/0332048 A1 | 11/2015 | Mooring et al. |
| 2015/0332195 A1 | 11/2015 | Jue |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019536 A1 | 1/2016 | Ortiz et al. |

(56) References Cited

U.S. PATENT DOCUMENTS

| | | |
|---|---|---|
| 2016/0026486 A1 | 1/2016 | Abdallah |
| 2016/0048606 A1 | 2/2016 | Rubinstein et al. |
| 2016/0072727 A1 | 3/2016 | Leafe et al. |
| 2016/0077901 A1 | 3/2016 | Roth et al. |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0124665 A1 | 5/2016 | Jain et al. |
| 2016/0140180 A1 | 5/2016 | Park et al. |
| 2016/0191420 A1 | 6/2016 | Nagarajan et al. |
| 2016/0212007 A1 | 7/2016 | Alatorre et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378554 A1 | 12/2016 | Gummaraju et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085591 A1 | 3/2017 | Ganda et al. |
| 2017/0093684 A1 | 3/2017 | Jayaraman et al. |
| 2017/0093920 A1 | 3/2017 | Ducatel et al. |
| 2017/0230499 A1 | 8/2017 | Mumick et al. |
| 2017/0272462 A1 | 9/2017 | Kraemer et al. |
| 2017/0286143 A1 | 10/2017 | Wagner et al. |
| 2017/0371724 A1 | 12/2017 | Wagner et al. |
| 2018/0046453 A1 | 2/2018 | Nair et al. |
| 2018/0046482 A1 | 2/2018 | Karve et al. |
| 2018/0060221 A1 | 3/2018 | Yim et al. |
| 2018/0067841 A1 | 3/2018 | Mahimkar |
| 2018/0068115 A1* | 3/2018 | Golovkin ............ G06F 21/566 |
| 2018/0121245 A1 | 5/2018 | Wagner et al. |
| 2018/0143865 A1 | 5/2018 | Wagner et al. |
| 2018/0239636 A1 | 8/2018 | Arora et al. |
| 2018/0253333 A1 | 9/2018 | Gupta |
| 2018/0275987 A1 | 9/2018 | Vandeputte |
| 2019/0072529 A1 | 3/2019 | Andrawes et al. |
| 2019/0108058 A1 | 4/2019 | Wagner et al. |
| 2019/0155629 A1 | 5/2019 | Wagner et al. |
| 2019/0171470 A1 | 6/2019 | Wagner |
| 2019/0196884 A1 | 6/2019 | Wagner |
| 2019/0227849 A1 | 7/2019 | Wisniewski et al. |
| 2019/0384647 A1 | 12/2019 | Reque et al. |
| 2019/0391834 A1 | 12/2019 | Mullen et al. |
| 2019/0391841 A1 | 12/2019 | Mullen et al. |
| 2020/0057680 A1 | 2/2020 | Marriner et al. |
| 2020/0104198 A1 | 4/2020 | Hussels et al. |
| 2020/0104378 A1 | 4/2020 | Wagner et al. |
| 2020/0192707 A1 | 6/2020 | Brooker et al. |

FOREIGN PATENT DOCUMENTS

| | | |
|---|---|---|
| JP | 2006-107599 A | 4/2006 |
| JP | 2007-538323 A | 12/2007 |
| JP | 2010-026562 A | 2/2010 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2020/005764 A1 | 1/2020 |
| WO | WO 2020/069104 A1 | 4/2020 |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL : http://docs.aws.amazon.com/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

Bhadani et al., Performance evaluation of web servers using central load balancing policy over virtual machines on cloud, Jan. 2010, 4 pages.

CodeChef ADMIN discussion web page, retrieved from https://discuss.codechef.com/t/what-are-the-memory-limit-and-stack-size-on-codechef/14159, 2019.

CodeChef IDE web page, Code, Compile & Run, retrieved from https://www.codechef.com/ide, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, 2014, 13 pages.

Deis, Container, 2014, 1 page.

Dombrowski, M., et al., Dynamic Monitor Allocation in the Java Virtual Machine, JTRES '13, Oct. 9-11, 2013, pp. 30-37.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Han et al., Lightweight Resource Scaling for Cloud Applications, 2012, 8 pages.

Hoffman, Auto scaling your website with Amazon Web Services (AWS)—Part 2, Cardinalpath, Sep. 2015, 15 pages.

http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.

https://www.codechef.com code error help page from Jan. 2014, retrieved from https://www.codechef.com/JAN14/status/ERROR,va123, 2014.

http://www.codechef.com/ide web page from date Apr. 5, 2015, retrieved using the WayBackMachine, from https://web.archive.org/web/20150405045518/http://www.codechef.com/ide, 2015.

(56) References Cited

OTHER PUBLICATIONS

Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41 (1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, 2019.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071 dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.

\* cited by examiner

RESOURCE UTILIZATION-BASED MALICIOUS TASK DETECTION IN AN ON-DEMAND CODE EXECUTION SYSTEM

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
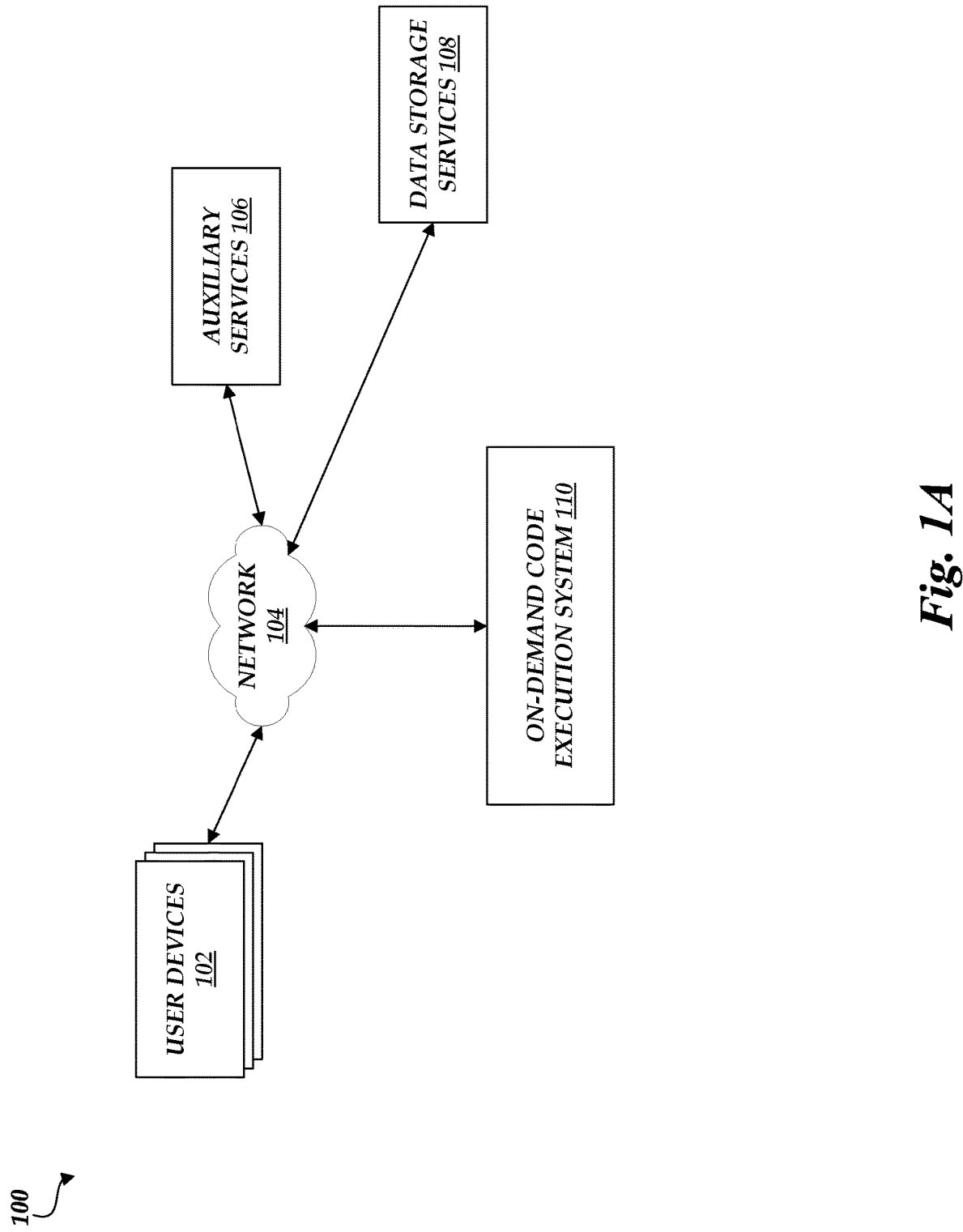
FIGS. 1A and 1B are block diagrams depicting an illustrative environment in which an on-demand code execution system can execute tasks corresponding to code, which may be submitted by users of the on-demand code execution system, and can detect tasks whose resource utilization signatures correspond to malicious tasks in accordance with aspects of the present disclosure.

Generally described, aspects of the present disclosure relate to an on-demand code execution system. The on-demand code execution system enables rapid execution of code, which may be supplied by users of the on-demand code execution system. More specifically, aspects of the present disclosure relate to detecting and, in some embodiments, preventing the execution of malicious tasks on an on-demand code execution system while preserving user privacy with regard to the code being executed.

As described in detail herein, an on-demand code execution system—which in some instances is referred to as a "serverless" system—may provide a network-accessible service enabling users to submit or designate computer-executable code to be executed by virtual machine instances on the on-demand code execution system. Each set of code on the on-demand code execution system may define a "task," and may implement specific functionality corresponding to that task when executed on a virtual machine instance of the on-demand code execution system. Because each task implements a given functionality, tasks may in some instances be also referred to as "functions." Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds), thus enabling execution of tasks in "real-time" (e.g., with little or no perceptible delay to an end user).

The on-demand code-execution system may thus allow users to execute code in a serverless environment (e.g., one in which the underlying server is not under user control). The term "serverless environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

As described in more detail below, the on-demand code execution system may include a worker manager configured to receive user code (threads, programs, etc., composed in any of a variety of programming languages) and execute the code in a highly scalable, low latency manner, without requiring user configuration of a virtual machine instance.

Specifically, the worker manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the worker manager receives user-initiated requests to execute code, and identifies a pre-configured virtual machine instance to execute the code based on configuration information associated with the request. The worker manager can further allocate the identified virtual machine instance to execute the user's code at least partly by creating and configuring containers inside the allocated virtual machine instance, and provisioning the containers with code of the task as well as a dependency code objects. Various embodiments for implementing a worker manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

While a virtual machine instance executing an operating system is described herein as one example of an execution environment, other execution environments are also possible. For example, tasks or other processes may be executed within a software "container," which provides an isolated runtime environment without itself providing virtualization of hardware. Containers may be implemented within virtual machines to provide additional security, or may be run outside of a virtual machine instance. In general, containers may differ from virtual machines in that they do not provide a distinct operating system kernel, but instead utilize a kernel of an underlying operating system. A virtual machine instance, by contrast, may provide a discrete kernel under control of the virtual machine and separate from a kernel of an underlying OS (e.g., the hypervisor). In some embodiments, the on-demand code execution system as disclosed herein may execute tasks within "microVMs," which represent virtual machines with reduced or minimized hardware emulation. Such microVMs may have operational characteristics (e.g., overhead resource consumption, startup time, etc.) similar to a container, but still provide kernel-level isolation.

The on-demand code execution system may therefore execute various tasks on behalf of users by executing user-submitted code corresponding to each task. The code submitted by users may generally make efficient use of the on-demand code execution system and may execute without detrimental impact on other users or computing systems. However, users may deliberately or inadvertently request execution of code that is malicious or that makes inefficient use of computing resources. For example, a user may submit code to the on-demand code execution system that relies on a third-party library, and the third-party library may include bitcoin mining software or other software that the user did not intend to execute. The user-submitted code may thus fraudulently consume resources of the on-demand code execution system for the benefit of someone other than the user. As a further example, a user may submit malicious code to the on-demand code execution system that attempts to propagate malware or that provides a command-and-control function for malware. These tasks are collectively referred to herein as "malicious tasks," although it will be understood that this term may include tasks that are not malicious per se but that the operator of the on-demand code execution system desires to prevent or discourage from executing.

An on-demand code execution system may prevent execution of some malicious tasks using code inspection, which analyzes the user-submitted executable code itself to identify characteristics of malicious code. However, such techniques can be thwarted by obfuscating the malicious code (e.g., changing variable names or function names), encrypting the malicious code, or otherwise changing the appearance of the malicious code without changing its function. Similarly, an on-demand code execution system may attempt to identify some malicious tasks by analyzing the results of executing the user-submitted code to identify behaviors or activities associated with malicious code (e.g., port scanning, attempting to exploit known vulnerabilities, etc.). However, these techniques may be limited in their ability to prevent malicious execution before the fact, or may involve tradeoffs (e.g., quarantining the code in a controlled environment) that are detrimental to efficient and timely execution of user-submitted tasks. Further, subjecting user-submitted code to inspection or output monitoring may have privacy or security implications, and may not be permissible for some applications (e.g., code that must be compliant with HIPAA, Sarbanes-Oxley, or other security or privacy regulations).

To address these problems, an on-demand code execution system may implement a resource signature management system as described herein. A resource signature management system may generate a resource utilization signature for a user-submitted task. Execution of the user-submitted code may utilize varying quantities of the computing resources allocated to the associated virtual machine instance or container, and may utilize these resources at varying rates. For example, execution of a task may utilize a low amount of memory initially, gradually increase as the task continues to execute, and then taper off as the task nears completion. As a further example, a task may read a high volume of data from a storage device, write the data to memory, utilize a processor to analyze or manipulate the data, and then write the analyzed or manipulated data from memory to the storage device. A resource signature management system may thus determine a "fingerprint" or resource utilization signature for the task, and may compare the signature of the user-submitted task to the signatures of tasks that are associated with malicious code. The resource signature management system may then use the results of its analysis to warn users regarding code that could be harmful or undesirable, or to deny requests to execute such code. The resource signature utilization system may thus identify tasks that have similar or identical resource utilization despite differences in the respective code for the tasks. The resource signature management system may analyze resource utilization without impacting privacy or security, for example, by analyzing the quantity of reads and writes to a storage device without accessing the content that was read or written, analyzing memory allocation and de-allocation without accessing the contents of memory, and so forth.

As used herein, the terms "malicious task" or "malicious code" may generally refer to any task (or to the code corresponding to a task) that an operator of the on-demand code execution system desires to prevent from executing or to warn users before executing. Illustratively, malicious tasks may include code such as viruses, worms, Trojans, and the like. Malicious tasks may further include code that violates terms of service (e.g., code that launches denial of service attacks, sends bulk email, probes other servers for vulnerabilities, etc.), code that appears to be malfunctioning (e.g., a software package with a known defect or vulnerability that appears to have been triggered), or other code that may be desirable to prevent from executing on an on-demand code execution system or to alert a user of possible issues with executing. In some embodiments, malicious tasks may include tasks that make inefficient use of the resources of the on-demand code execution system. For example, code that mines blockchain-based currencies may be uneconomical to execute on the on-demand code execution system. Execution of such code may thus indicate that a user has been duped or deceived into requesting the execution of such code, or that the user's credentials have been stolen and are being used to execute such code at the user's expense.

In some embodiments, malicious code may be identified based on resource utilization characteristics (e.g., network utilization that is consistent with port scanning, processor utilization that is consistent with bitcoin mining, etc.), or based on analysis of the results of executing the task, or from pre-defined lists of "known" malware. Resource utilization signatures for tasks that have been identified as malicious tasks may then be generated in a controlled environment, which in various embodiments may be within the on-demand code execution system or an external system.

As will be appreciated by one of skill in the art in light of the present disclosure, the embodiments disclosed herein improve the ability of computing systems, such as on-demand code execution systems, to execute code in an efficient manner. Moreover, the presently disclosed embodiments address technical problems inherent within computing systems; specifically, the problems of detecting and preventing execution of malicious tasks in an on-demand code execution system. These technical problems are addressed by the various technical solutions described herein, including the implementation of a resource utilization signature analysis system within an on-demand code execution system to detect and prevent execution of malicious tasks. For example, the use of resource utilization signatures enables identification of malicious tasks without reference to the code itself and without reference to the output produced by the code, which overcomes various techniques used by malware authors to disguise code or its actions (e.g., encrypting the code, obfuscating the code, disguising malware output as other network traffic, etc.) as described above. Identifying malicious tasks without reference to the code also provides greater security to users submitting code that contains trade secrets or other proprietary information, since the resource utilization signature can be generated without granting access to the code. Thus, the present disclosure represents an improvement on existing data processing systems and computing systems in general.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain embodiments. Furthermore, various embodiments may include several novel features, no single one of which is solely responsible for its desirable attributes or which is essential to practicing the embodiments herein described.

FIG. 1A is a block diagram of an illustrative operating environment 100 in which an on-demand code execution system 110 may operate based on communication with user computing devices 102, auxiliary services 106, and network-based data storage services 108. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (including metadata identifying dependency code objects for the uploaded code), invoking the user-provided code (e.g., submitting a request to execute the user code on the on-demand code execution system 110), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The illustrative environment 100 further includes one or more network-based data storage services 108, which are configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. In yet another example, the network-based data storage services 108 may represent a block-based storage system providing virtualized block storage devices, or an object-based storage system providing storage at an object level. The network-based data storage services 108 may further enable the on-demand code execution system 110 to query for and retrieve information regarding data stored within the on-demand code execution system 110, such as by querying for a number of relevant objects, files or records; sizes of those objects, files or records; file, object or record names; file, object or record creation times; etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In the example of FIG. 1A, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the operating environment 100. In one example, only the frontend 120 depicted in FIG. 1B (which may in some instances represent multiple frontends 120) may be connected to the network 104, and other components of the on-demand code execution system 110 may communicate with other components of the environment 100 via the frontends 120.

In FIG. 1A, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the on-demand code execution system 110 may configure the virtual machine instances with customized operating systems to execute the user's code more efficiency and reduce utilization of computing resources.

Figure 1B:
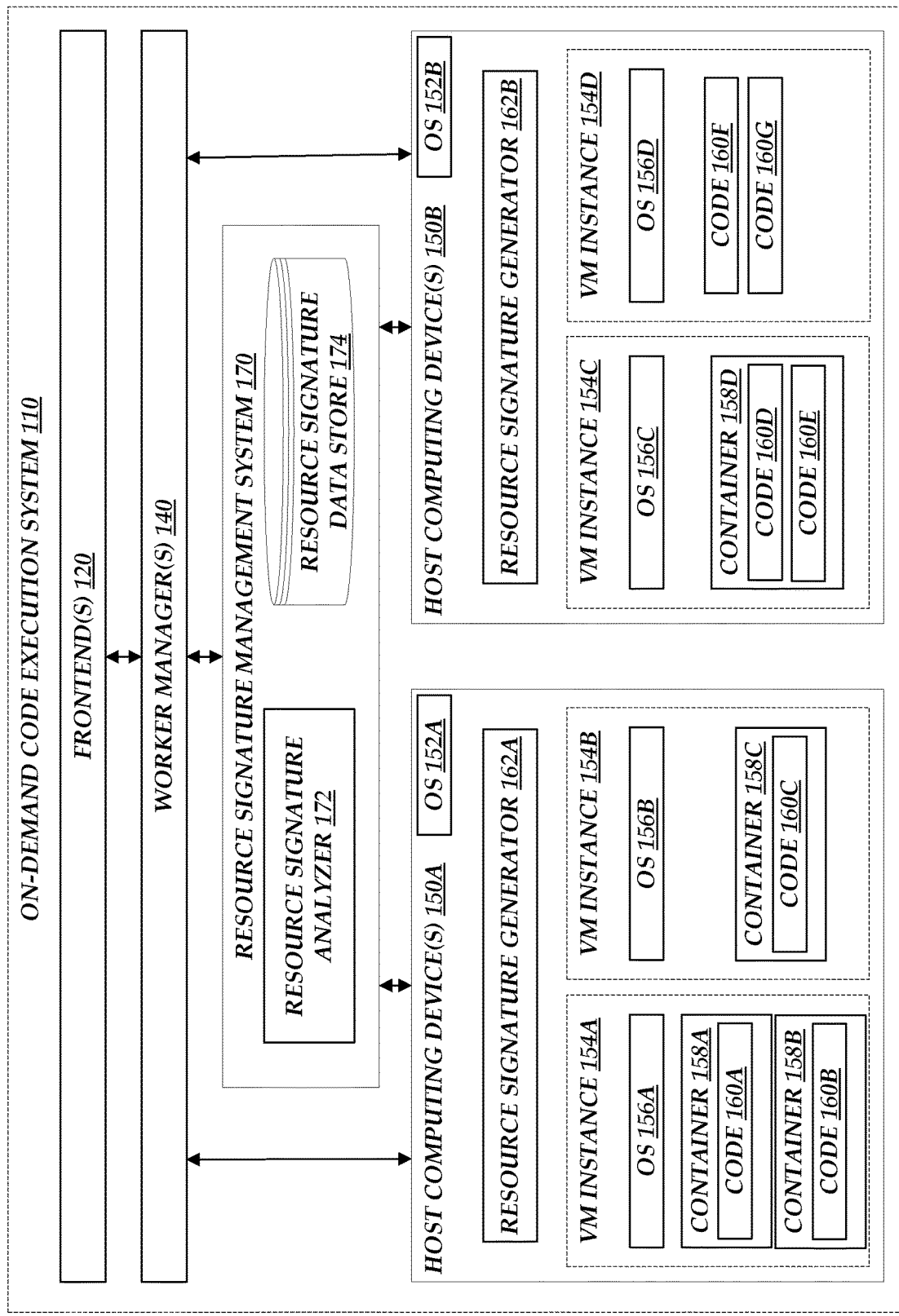

With reference now to FIG. 1B, the on-demand code execution system 110 is depicted as operating in a distributed computing environment including several computer systems that are interconnected using one or more computer networks (not shown in FIG. 1B). The on-demand code execution system 110 could also operate within a computing environment having a fewer or greater number of devices than are illustrated in FIG. 1B. Thus, the depiction of the on-demand code execution system 110 in FIG. 1B should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of executing computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of data storage services 108 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1B), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1B), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1B) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1B) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more worker managers 140 that manage the execution environments used for servicing incoming calls to execute tasks. In the example illustrated in FIG. 1B, each worker manager 140 manages an active pool of virtual machine instances 154A-D, which are currently assigned to one or more tasks and are implemented by one or more host computing devices 150A-B. Host devices 150 may represent physical computing devices, or virtual machine instances that are in turn hosted by physical computing devices. The host computing devices 150A-B and the virtual machine instances 154A-D may further implement one or more containers 158A-D, which may contain and execute one or more user-submitted codes 160A-G. Containers are logical units created within a virtual machine instance, or on a host computing device, using the resources available on that instance or device. For example, each worker manager 140 may, based on information specified in a call to execute a task, create a new container or locate an existing container 158A-D and assign the container to handle the execution of the task. Each container may correspond to an execution environment for the task, providing at least some isolation from other execution environments. For example, each container may provide a file system isolated from other file systems on the device, and code executing in the container may have limited or no access to other file systems or memory space associated with code executing outside of the container. In some embodiments, the virtual machine instances 154A-D may execute one or more user-submitted codes, such as user-submitted codes 160F-G, without implementing a container. For example, each virtual machine instance 154 may represent a "microVM" that is configured to act as an execution environment for a given task.

The containers 158A-D, virtual machine instances 154A-D, and host computing devices 150A-B may further include language runtimes, code libraries, or other supporting functions (not depicted in FIG. 1) that facilitate execution of user-submitted code 160A-G. The physical computing devices 150A-B and the virtual machine instances 154A-D may further include operating systems 152A-B and 156A-D. In various embodiments, operating systems 152A-B and 156A-D may be the same operating system, variants of the same operating system, different operating systems, or combinations thereof.

Although the virtual machine instances 154A-D are described here as being assigned to a particular task, in some embodiments, an instance 154A-D may be assigned to a group of tasks, such that the instance is tied to the group of tasks and any member of the group can utilize resources on the instance. For example, the tasks in the same group may belong to the same security group (e.g., based on their security credentials) such that executing one task in a container on a particular instance after another task has been executed in another container on the same instance does not pose security risks. Similarly, the worker managers 140 may assign the instances and the containers according to one or more policies that dictate which requests can be executed in which containers and which instances can be assigned to which tasks. An example policy may specify that instances are assigned to collections of tasks created under the same account (e.g., account for accessing the services provided by the on-demand code execution system 110). In some embodiments, the requests associated with the same tasks group may share the same containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

As shown in FIG. 1B, various combinations and configurations of host computing devices 150A-B, virtual machine instances 154A-D, and containers 158A-D may be used to facilitate execution of user submitted code 160A-G. In the illustrated example, the host computing device 150A implements two virtual machine instances 154A and 154B. Virtual machine instance 154A, in turn, implements two containers 158A and 158B, which contain user-submitted code 160A and 160B respectively. Virtual machine instance 154B implements a single container 158C, which contains user-submitted code 160C. The host computing device 150B further implements two virtual machine instances 154C and 154D; the virtual machine instance 154C implements container 158D, which contains user-submitted codes 160D and 160E, and the virtual machine instance 154D directly contains user-submitted codes 160F and 160G. It will be understood that these embodiments are illustrated for purposes of example, and that many other embodiments are within the scope of the present disclosure.

FIG. 1B depicts a single worker manager 140. However, in one embodiment, the system 110 includes multiple worker managers 140. Each worker manager 140 may coordinate operation of individual execution environments (e.g., VM instances 154 or containers 158) on or distributed among host devices 150. For example, the system 110 may include a placement service (not shown in FIG. 1) that is configured to assign individual execution environments to a worker manager 140, by allowing such a manager 140 to "lease" the environment. During the period of a lease, the worker manager 140 may be designated as having operational control of the environment. A set of environments currently leased to a manager 140 (e.g., across all hosts 150) may be referred to as an "active pool" of environments. Leases for each environment may be renewed during a period of use (e.g., active execution of a task), and allowed to expire after a period of non-use, such as n minutes after a last task was executed. Each host device 150 may further be configured to pre-configure additional execution environments outside of the active pool, such that those environments are instantiated with software required to execute a task (e.g., a runtime, libraries, operating system if required, etc.) and are maintained in a ready and "warmed" state. A set of environments that are maintained in this ready state (e.g., across all hosts 150) may be referred to as a "warming pool" of environments. Illustratively, upon receiving a request to execute a task, each worker manager 140 may be configured to determine whether a currently-leased environment can support execution of the task, and if so, to execute the task within that environment. If no currently-leased environment can support execution of the task, the worker manager 140 may submit to the placement service a request to lease a new environment. The placement service may then identify an unleased environment on a host device 150, and return to the worker manager 140 information identifying that environment. The worker manager 140 may thereafter use the environment to support execution of the task. While FIG. 1B shows a limited number of environments, each host device 150 may support a large number of environments. For example, with respect to use of microVMs as execution environments, a single host device may support thousands of environments. Similarly, while FIG. 1B shows a limited number if host devices 150, any number of host devices 150 may be implemented, enabling the system 110 to support a very high number of concurrent task executions.

In the illustrated embodiment, the host computing devices 150A and 150B include a resource signature generator 162A and 162B respectively. Illustratively, the resource signature generators 162A and 162B may monitor the utilization of computing resources and generate resource utilization signatures for tasks that are executed on the respective host computing devices 150A and 150B by monitoring utilization of computing resources by the virtual machine instance 154A-D (or, in some embodiments, the container 158A-D) that executes the task on the respective host computing device 150A or 150B. As described in more detail below, monitored computing resources may include physical or virtual resources, and the resource signature generators 162A and 162B may collect resource utilization metrics such as processor utilization (which may include central processing unit or "CPU" utilization, graphics processing unit or "GPU" utilization, tensor processing unit or "TPU" utilization, other processing unit utilization, and various combinations thereof), memory utilization, memory throughput (e.g., the volume of reads and writes to memory during a specified time interval), network throughput, data store utilization, data store throughput, and other such measurements. The resource signature generators 162A and 162B may further generate resource utilization signatures based on the collected resource utilization metrics, as described in more detail below.

The on-demand code execution system 110 may further include a resource signature management system 170. The resource signature management system 170 may include a resource signature analyzer 172, which as described in more detail below may analyze resource utilization signatures of user-submitted tasks and determine whether a signature corresponds to a malicious task signature. The resource signature management system 170 may further include a resource signature data store 174, which may store resource utilization signatures of previously executed tasks and/or resource utilization signatures of tasks that have been identified as or associated with malicious tasks. The resource signature data store 174 may illustratively be any non-transitory computer readable storage medium.

While depicted in FIG. 1B as external to the host computing devices 150A-B, all or part of the resource signature management system 170 may, in various embodiments, be implemented on the host computing devices 150A-B. For example, the resource signature analyzer 172 may be implemented on the host computing devices 150A-B, and may obtain "known" resource signatures from a centralized resource signature data store 174. As a further example, each host computing device 150A-B may maintain a resource signature analyzer 172 and a local copy of the resource signature data store 174 in order to reduce latency when analyzing the signature of an executing task.

While some functionalities are generally described herein with reference to an individual component of the on-demand code execution system 110, other components or a combination of components may additionally or alternatively implement such functionalities. For example, a worker manager 140 may operate to provide functionality associated with collecting or analyzing resource utilization signatures from host computing devices 150A-B as described herein.

Figure 2:
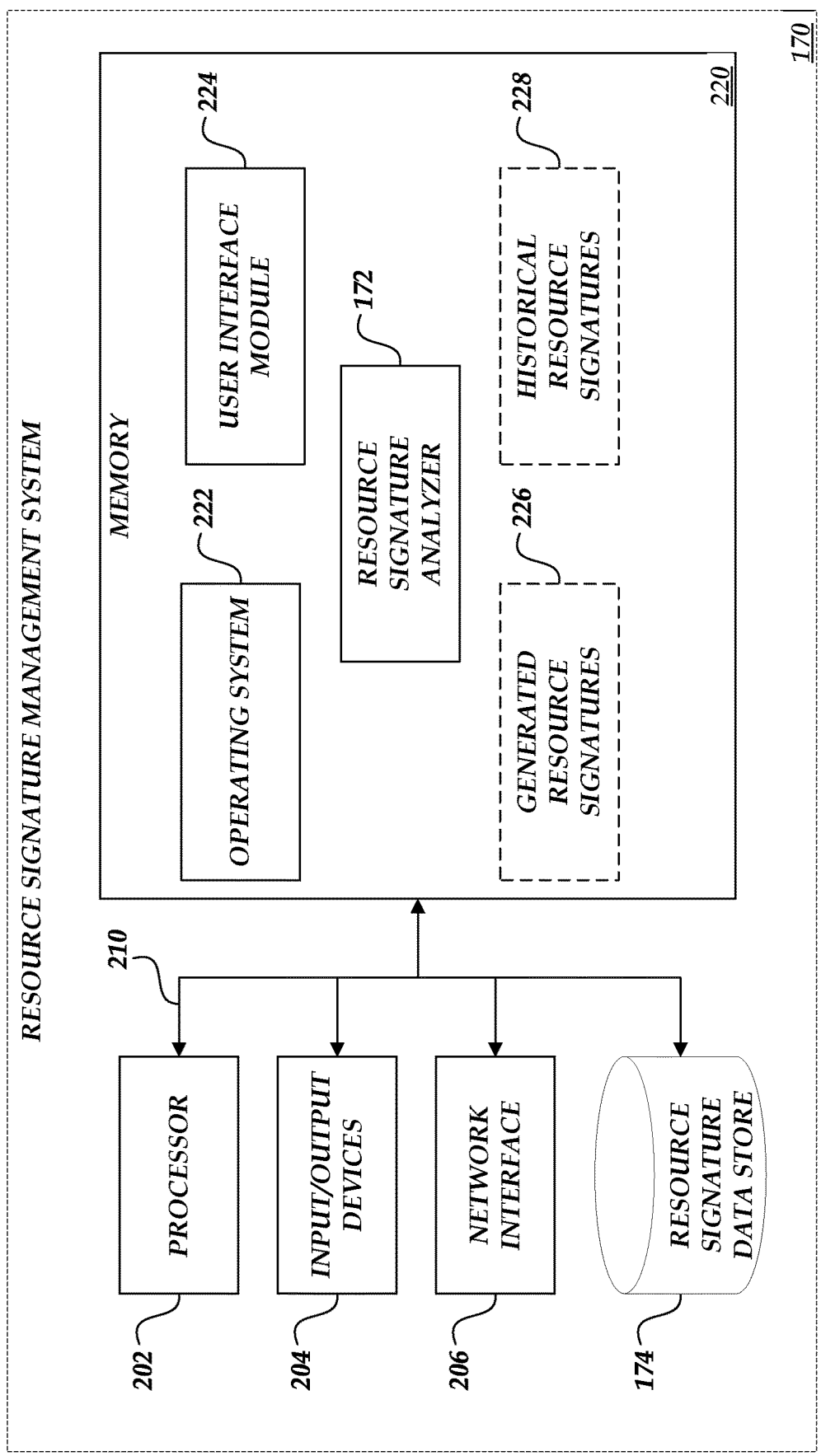
FIG. 2 depicts a general architecture of a computing device that is used by an on-demand code execution system to analyze resource utilization signatures associated with tasks executed on demand in accordance with aspects of the present disclosure.

FIG. 2 depicts a general architecture of a computing system (referenced as the resource signature management system 170) that operates to analyze resource utilization signatures generated during execution of user-submitted tasks within the on-demand code execution system 110 in accordance with aspects of the present disclosure. The general architecture of the resource signature management system 170 depicted in FIG. 2 includes an arrangement of computer hardware and software modules that may be used to implement aspects of the present disclosure. The hardware modules may be implemented with physical electronic devices, as discussed in greater detail below. The resource signature management system 170 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIGS. 1A-B.

The resource signature management system 170 includes a processor 202, input/output device interfaces 204, a network interface 206, and the resource signature data store 174, all of which may communicate with one another by way of a communication bus 210. The network interface 206 may provide connectivity to one or more networks or computing systems. The processor 202 may thus receive information and instructions from other computing systems or services via the network 104. The processor 202 may also communicate to and from a memory 220 and further provide output information for an optional display (not shown) via the input/output device interfaces 204. The input/output device interfaces 204 may also accept input from an optional input device (not shown). The resource signature data store 176 may generally be any non-transitory computer-readable data store, including but not limited to hard drives, solid state devices, magnetic media, flash memory, and the like. In some embodiments, the resource signature data store 176 may be implemented as a database, web service, or cloud computing service, and may be external to the resource signature management system 170 (e.g., the data storage services 108 depicted in FIG. 1A). Additionally, in various embodiments, the resource signature data store 176 may be implemented as a single data store or distributed across multiple data stores.

The memory 220 may contain computer program instructions (grouped as modules in some embodiments) that the processor 202 executes in order to implement one or more aspects of the present disclosure. The memory 220 generally includes random access memory (RAM), read only memory (ROM) and/or other persistent, auxiliary or non-transitory computer readable media. The memory 220 may store an operating system 222 that provides computer program instructions for use by the processor 202 in the general administration and operation of the resource signature management system 170. The memory 220 may further include computer program instructions and other information for implementing aspects of the present disclosure. For example, in one embodiment, the memory 220 includes a user interface module 224 that generates interfaces (and/or instructions therefor) for interacting with the frontends 120, worker managers 140, or other computing devices, e.g., via an API, CLI, and/or Web interface. In addition, the memory 220 may include and/or communicate with one or more data repositories (not shown), for example, to access user program codes and/or libraries.

In the illustrated embodiment, the memory 220 further includes the resource signature analyzer 172, which (as described in more detail below with reference to FIG. 3) may analyze resource utilization signatures that have been loaded into the memory 220, such as the generated resource signatures 226 and the historical resource signatures 228. The generated resource signatures 228 may include resource utilization signatures generated during execution of user-submitted tasks, for example by the resource signature generators 162A-B depicted in FIG. 1B. The historical resource signatures 228 may be loaded into the memory 220 from a data store (e.g., the resource signature data store 174), and may include signatures of tasks that were previously executed on the on-demand code execution system 110. The historical resource signatures 228 may also include malicious task signatures. In some embodiments, the malicious task signatures may correspond to tasks that were previously executed on the on-demand code execution system 110 and identified as malware based on the results of task execution.

In some embodiments, the resource signature management system 170 may further include components other than those illustrated in FIG. 2. For example, the memory 220 may further include information regarding pending requests to execute user-submitted tasks that have previously been identified as malicious tasks, or may include other information that facilitates identification of malicious tasks. FIG. 2 is thus understood to be illustrative but not limiting.

Figure 3:
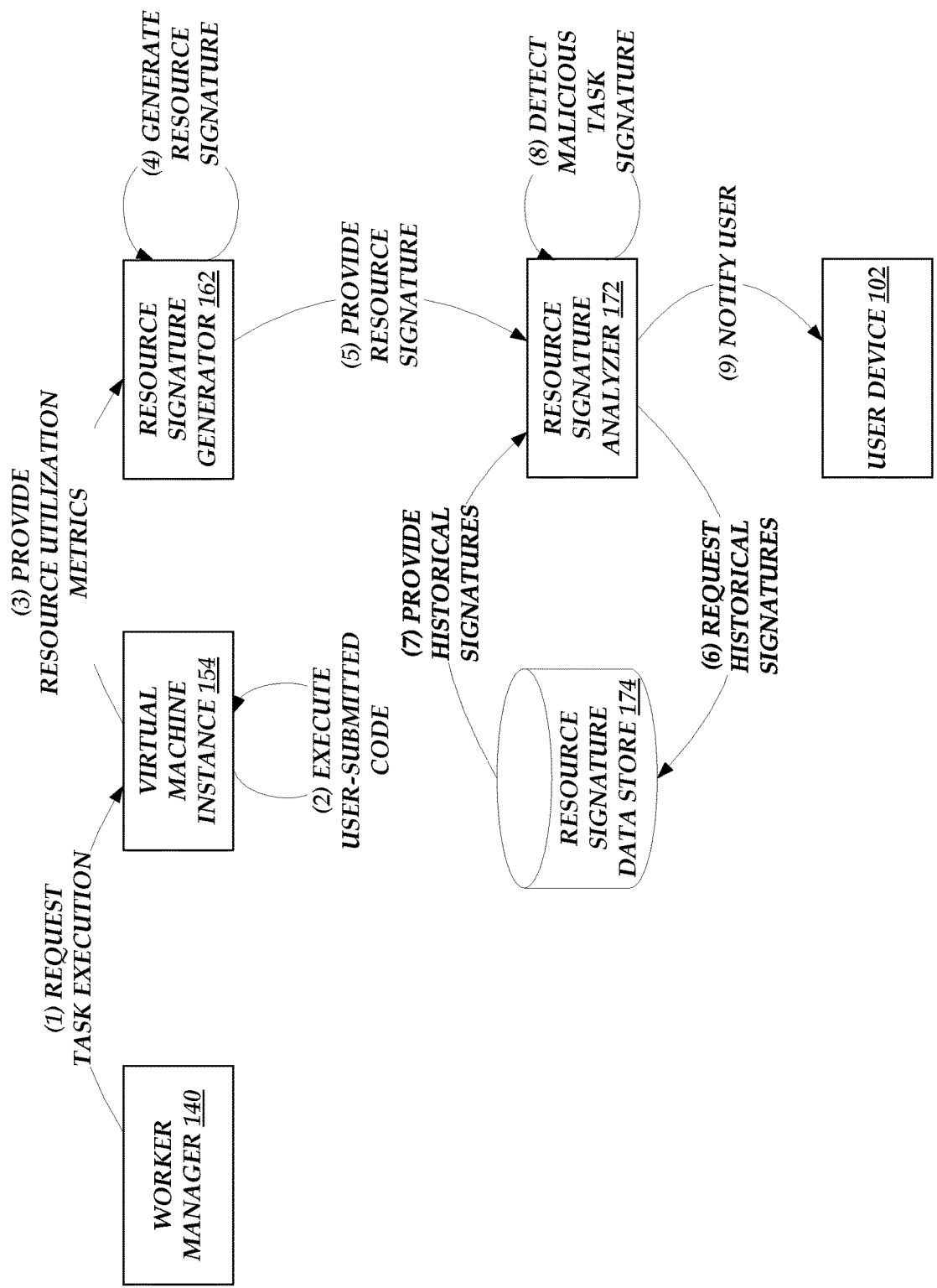
FIG. 3 is a flow diagram depicting illustrative interactions for generating resource utilization signatures and detecting malicious tasks in accordance with aspects of the present disclosure.

FIG. 3 depicts illustrative interactions for generating resource utilization signatures and detecting malicious tasks in accordance with aspects of the present disclosure. As discussed above, the illustrative interactions may allow an on-demand code-execution system to make more efficient use of computing resources by preventing or discouraging execution of malicious tasks. At (1), a worker manager 140 instructs a virtual machine instance 154 (or, in some embodiments, a container or a host computing device) to execute a task on an on-demand code execution system. In some embodiments, the worker manager 140 may issue instructions in response to a request from a user device 102, as depicted in FIG. 1B. In other embodiments, the worker manager 140 may instruct a virtual machine instance 154 to execute a task independently of receiving a request from a user device 102. For example, a user may specify that a task should be executed when certain criteria are satisfied, and the worker manager 140 (or, in some embodiments, the frontend 120 or another component) may determine that the criteria have been satisfied. At (2), the virtual machine instance 154 executes the user-submitted code.

At (3), the virtual machine instance 154 provides resource utilization metrics to the resource signature generator 162. In various embodiments, the virtual machine instance 154 may provide resource utilization metrics before, during, or after the interaction at (2). In further embodiments, the virtual machine instance 154 may provide resource utilization metrics periodically (e.g., once every 100 milliseconds), in response to resource utilization (e.g., a change in processor utilization that exceeds a threshold), in conjunction with an event on the virtual machine instance 154 (e.g., starting, ending, pausing, or resuming execution of the user-submitted scode), by request of the resource signature generator 162, or in accordance with other criteria. Resource utilization metrics may include, for example, the total amount of memory allocated, the quantity of data written or read from memory within a specified time interval, a percentage of processor utilization, an amount of network bandwidth consumed, and the like. In various embodiments, resource utilization may be measured with regard to real or virtual resources.

At (4), the resource signature generator 162 may process the collected resource utilization metrics to generate a resource utilization signature for the user-submitted task. In various embodiments, the resource signature generator 162 may generate a locality sensitive hash value, one or more vectors, numerical score, or other representation of the resource utilization that occurred during execution of the task. For example, the resource signature generator 162 may generate a processor utilization vector such as [31%, 15%, 14%, 53%, 38%, 42%, 71%, 27%, 19%, 21%], which may indicate that processor utilization averaged 31% during a first time interval in which the task was executing, 15% during a second time interval, and so forth. In some embodiments, resource utilization metrics may be scaled or converted to a measure (e.g., floating point operations per second) that enables comparison between computing resources that vary in terms of capabilities, such as faster or slower processors. The resource signature generator 162 may generate similar vectors for utilization of other computing resources, such as an amount or percentage of memory utilized or a number of input/output operations for a data store, and may thus generate a multidimensional vector representing utilization of multiple computing resources or different measures of utilization of a computing resource. As a further example, the resource signature generator 162 may generate a locality sensitive hash value that represents a utilization pattern, such that other user-submitted tasks with similar utilization patterns will have similar has values. For example, the resource signature generator 162 may generate a value in accordance with a hash function ƒ that maps a point or points in a multidimensional coordinate space to a scalar value in a manner that preserves the relative distance between the input coordinates and output scalar values. In some embodiments, hash values may be generated within a range of possible values (e.g., 1 to 1,000), and hash values at distant ends of the scale may indicate a utilization pattern and its opposite. For example, a task with a hash value of 250 may have relatively high processor utilization and relatively low memory utilization, while a task with a hash value of 750 may have the opposite pattern.

At (5), the resource signature generator 162 may provide the generated resource signature to the resource signature analyzer 172. At (6), the resource signature analyzer 172 may request historical signatures from the resource signature data store 174. In some embodiments, the resource signature analyzer 172 may instead query a search engine for a historical signature that is similar to or matches the resource utilization signature generated at (4). In other embodiments, the resource signature analyzer 172 may request a collection of "known" malicious task signatures from the resource signature data store 174. At (7), the resource signature data store 174 provides the requested historical signatures to the resource signature analyzer 172.

At (8), the resource signature analyzer 172 may analyze the generated resource utilization signature and the historical signatures to determine whether the generated resource utilization signature corresponds to a malicious task signature. In some embodiments, the resource signature analyzer 172 may determine whether the generated resource utilization signature matches a malicious task signature. In other embodiments, the resource signature analyzer 172 may determine whether the generated resource utilization signature is within a predetermined range of a malicious task signature. For example, the resource signature analyzer 172 may compare a task with a resource utilization hash value of 732 to a list of known malicious task signatures, and determine that the hash value corresponds to or is within a specified value of a malicious task signature. In some embodiments, the resource signature analyzer 172 may use techniques known in the art, such as multivariate dynamic time warping, string edit distance, the Needleman-Wunsch algorithm, or similar approaches to compare resource utilization signatures. For example, the resource utilization signature generated at (4) may be generated in a computing environment with a processor that is faster or slower than the processor that was in use when the historical signatures were generated. The resource signature analyzer 172 may therefore use dynamic time warping to enable comparison of processor utilization between the signatures. In other embodiments, the resource signature analyzer 172 may use a k-nearest neighbor algorithm, a variety of which are known in the art, or similar techniques to compare locality sensitive hash scores. It will be understood that the present disclosure is not limited to a particular technique for comparing resource utilization signatures, and may use various techniques or combinations of techniques as needed to enable comparison.

In some embodiments, a machine learning algorithm may be selected and trained using the historical signatures (or subsets thereof) as training data in order to produce one or more trained models, and the resource signature analyzer 172 may select one or more trained models based on a confidence level in the results produced by individual trained models of the set. For example, the resource signature analyzer 172 may use a recurrent neural network or other machine learning model to determine a probability that a particular model correctly identifies malicious signatures based on the outcomes of applying the model to training data, and then may apply this model to the generated resource utilization signature to obtain a probability that the generated signature corresponds to a malicious signature. In further embodiments, different models may be trained to recognize different malicious resource utilization signatures, and the resource signature analyzer 172 may apply multiple models to determine whether the generated resource utilization signature corresponds to a malicious task signature. A variety of probabilistic classifier machine learning algorithms are known in the art and may be utilized to predict a classification (e.g., malicious or non-malicious) of a resource usage signature, based on training data that designates individual historical signatures as malicious or non-malicious.

In some embodiments, the resource signature analyzer 172 may determine that a portion of the resource utilization signature corresponds to a malware signature. For example, a malicious actor may insert code into a library or function that causes a user-submitted task to perform bitcoin mining in addition to the task that the user submitted to be executed. The resource signature analyzer 172 may thus determine a difference between the resource utilization signature for the current task and the resource utilization signature for a task previously executed on behalf of the same user, and may determine that this difference corresponds to a malicious task.

If a malicious task signature is detected, then at (9) the resource signature analyzer 172 notifies the user device 102 that the user-submitted task appears to correspond to malware based on its resource utilization. In some embodiments, the resource signature analyzer 172 may halt execution of the user-submitted code, add the user-submitted code to a blacklist, cause future executions of the user-submitted code to be throttled or assigned lower priorities, or otherwise limit execution of the user-submitted code. In other embodiments, the resource signature analyzer 172 may cause the user interface module 224 to generate a user interface that prompts the user as to whether they wish to proceed with execution. In further embodiments, the user may indicate that execution should proceed, and the resource signature analyzer 172 may whitelist the user-submitted code and/or its resource utilization signature.

In some embodiments, the resource signature analyzer 172 may notify a user account, administrator account, or another responsible party instead of, or in addition to, notifying the user device 102. Illustratively, the resource signature analyzer 172 may notify a responsible party that what appears to be malware has been submitted for execution to address the possibility that the user device 102 has been compromised by a malicious user, who is intentionally requesting execution of malware from an account they do not own. The resource signature analyzer 172 may therefore send a notification to, e.g., a contact email address associated with the user account, an administrator email address, or another party who can determine whether the user device 102 and/or an associated user account has been compromised.

In some embodiments, the interactions at (3)-(8) may be carried out repeatedly during the interaction at (2), and the resource signature analyzer 172 may detect and halt execution of a malicious task at a relatively early stage of execution. For example, the resource signature analyzer 172 may develop a confidence level that the resource utilization signature for an in-progress execution of a task corresponds to a malicious task signature, and may alert the user when the confidence level exceeds a threshold. As a further example, the resource signature analyzer 172 may halt execution of the task when the confidence level exceeds a threshold.

It will be understood that FIG. 3 is provided for purposes of example, and that many variations on the depicted interactions are within the scope of the present disclosure. For example, the resource signature analyzer 172 (or another component, such as the frontend 120, the worker manager 140, or the placement service described above) may determine prior to the interaction at (2) whether the task has previously been executed on the on-demand code execution system (e.g., by determining that the code associated with a task has not changed since a previous execution of the task). If so, the resource signature analyzer 172 may obtain a previously generated resource utilization signature that corresponds to the task, and may then carry out the interactions at (6)-(11) to verify whether the task's resource utilization signature corresponds to a malware signature and notify the user before executing the task. FIG. 3 is thus understood to be illustrative and not limiting.

Figure 4:
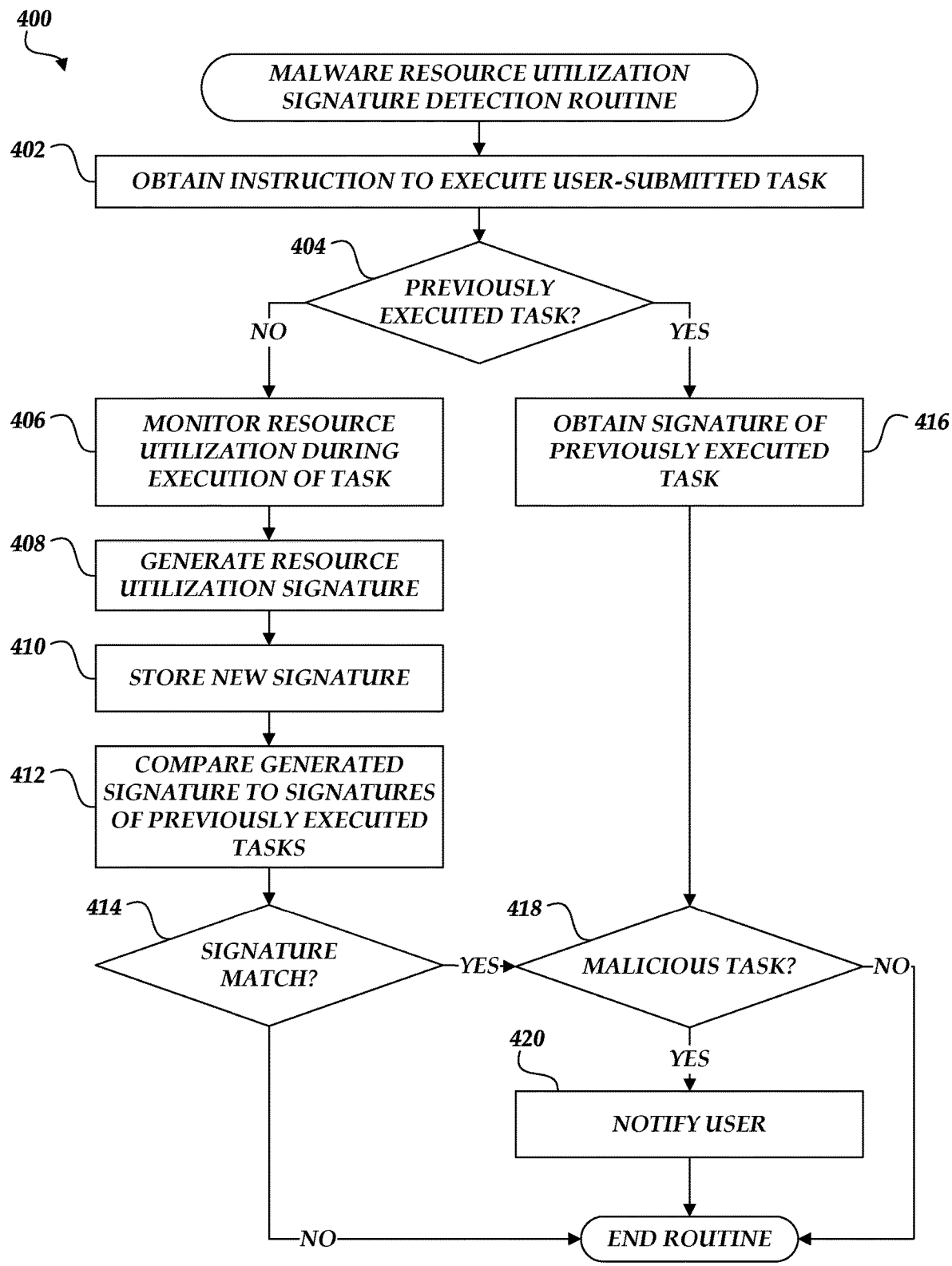
FIG. 4 is a flow chart depicting an illustrative routine for generating resource utilization signatures and detecting malicious tasks in accordance with aspects of the present disclosure.

FIG. 4 is a flow diagram of an illustrative routine 400 for detecting malware resource utilization signatures. In various embodiments, all or part of routine 400 may be carried out, for example, by the resource signature analyzer 172 depicted in FIG. 2, the host computing devices 150A-B depicted in FIG. 1B, the worker manager 140 depicted in 140, the placement service, or another component of the on-demand code execution system 110 depicted in FIGS. 1A and 1B. The routine 400 begins at block 402, where an instruction may be obtained to execute a user-submitted task on an on-demand code execution system. For example, a user-submitted task may be scheduled to execute when a criterion is satisfied, and the routine 400 may be carried out in conjunction with determining that the criterion has been satisfied. As a further example, a user may request execution of a user-submitted task via a frontend 120.

At decision block 404, a determination is made as to whether the user-submitted task has previously been executed by the on-demand code execution system. For example, a checksum may be obtained for the code associated with the user-submitted task, and the determination may be as to whether a resource utilization signature corresponding to the checksum was previously generated. If the determination is that the task has not previously been executed, then at block 406 resource utilization may be monitored during execution of the task. As described above, monitoring of utilization may include, for example periodic, threshold-based, or event-based collection of resource utilization metrics, such as processor utilization, data store utilization, network bandwidth consumption, memory throughput, and the like. For example, metrics may be periodically collected that measure the quantity of data transmitted in the most recent time period, the quantity of data received in the time period, the quantity of data read or written to memory, the amount of memory allocated, processor utilization, and the like. In various embodiments, metrics may be obtained in absolute terms (e.g., a number of reads/writes per time interval or a quantity of data written during the time interval) or relative terms (e.g., a percentage of available bandwidth consumed, a percentage of time the processor is idle, etc.), and may be scaled, converted, or normalized as necessary.

At block 408, a resource utilization signature corresponding to the task may be generated based on the collected resource utilization metrics. As described above, the resource utilization signature may be a locality sensitive hash value, vector(s), numerical value, or other representation of the computing resource utilization during execution of the task. For example, the resource utilization signature may be generated using a locality sensitive hash function that takes processor utilization and data store reads/writes per second as input, and provides a scalar value between 1 and 100 as output. The output of the hash function may be such that values at or near 25 represent high processor utilization and low data store utilization, values near 50 represent high processor utilization and high data store utilization, values near 75 represent low processor utilization and high data store utilization, and values near 100 (or 1) represent low processor utilization and low data store utilization. The resource utilization signature may thus group tasks with similar resource utilization together, and may indicate that tasks with "opposite" resource utilization are at maximum distances from each other on a scale that "wraps around" at the high and low values. At block 410, in some embodiments, the generated resource utilization signature may be stored in a data store for later retrieval (e.g., during subsequent invocations of the routine 400). Illustratively, the generated resource utilization signature may be associated with a unique identifier for the task, such as an ID number, that allows the routine 400 to recognize subsequent requests to execute the same task.

At block 412, the generated resource utilization signature may be analyzed and compared to the signatures of previously executed tasks. As described above, the resource utilization signature may be generated using a locality sensitive hashing function, which preserves the distance between similar input values while reducing the input to a lower number of dimensions. The lower-dimension hash values (e.g., scalar values) may then be compared directly and analyzed as to whether they are within a threshold distance of each other. In some embodiments, the resource utilization signature associated with the user-submitted task may be compared to signatures that were generated based on the resource utilization of a malicious task in a controlled environment rather than signatures that were generated by previous executions of the routine 400. It will thus be understood that, in some embodiments, the routine 400 may detect subsequent requests to execute a malicious task after an initial request to execute a particular malicious task has been carried out and a resource utilization signature has been partially or fully generated.

In some embodiments, the resource utilization signature generated at block 408 may correspond to partial execution of the task, and may be compared at block 412 to historical signatures that correspond to partial execution of historical tasks. Such comparisons may facilitate earlier recognition (e.g., during the execution of the task) that the current task corresponds to a previously executed task. In some embodiments, partial resource utilization signatures may further be associated with confidence levels. For example, a historical signature for the first tenth of a previously executed task may be associated with a 20% probability of being the same task, a historical signature for the first third of the previously executed task may be associated with a 70% probability of being the same task, and so forth. In further embodiments, historical resource utilization signatures may correspond to portions of a task, such that resource utilization during the middle third of a task can be compared to the middle third of a historical task. Illustratively, a first signature may be generated based on resource utilization during the first tenth of a task's execution, which may be used to identify a subset of historical tasks that may correspond to the currently executing task. A second signature may then be generated based on resource utilization during the second tenth of the task's execution, and the second signature may be used to filter the subset or to revise confidence levels for potentially corresponding tasks in the subset. Further signatures may be similarly generated and used to identify the historical task that is most likely to correspond.

At decision block 414, a determination may be made as to whether the generated resource utilization signature corresponds to an existing signature. In various embodiments, as discussed above, the determination may be as to whether the generated resource utilization signature matches an existing signature, is within a defined range of an existing signature, or otherwise corresponds to an existing signature or satisfies a criterion with regard to an existing signature. For example, a signature that comprises a vector representing utilization of various resources may correspond to an existing signature if a threshold number of elements of the vector correspond to each other. As a further example, a signature that comprises a matrix representing utilization of various resources over time may correspond to an existing signature if a threshold number of matrix rows correspond. If the determination is that the generated resource utilization signature corresponds to an existing signature, then the routine 400 branches to decision block 418, where a determination may be made as to whether the existing signature is a malware signature. If so, then at block 420 the user may be notified that the resource utilization signature of the submitted task corresponds to a malware signature. If the determination at decision block 418 is that the generated resource utilization signature does not correspond to a malware signature, or if the determination at decision block 414 is that the generated signature does not correspond to an existing signature, then the routine 400 ends. In some embodiments, as described above, all or part of the routine 400 may be carried out repeatedly during execution of the user-submitted task, and a confidence level may be determined as to whether the resource utilization signature of an in-progress task corresponds to a malicious task. The determination at decision block 418 may thus be a determination as to whether the confidence level satisfies a threshold. In other embodiments, as described above, confidence levels may be determined as to whether the generated signature corresponds to each of a set of malicious tasks, and the determination at decision block 418 may be as to whether any of the confidence levels exceed a threshold.

If the determination at decision block 404 is that the user-submitted task has previously been executed by the on-demand code execution system, then the routine 400 branches to block 416, where a resource utilization signature for the task may be obtained. Illustratively, the resource utilization signature from a previous execution of the task may be obtained to prevent the routine 400 from redundantly collecting the signature of a task that has already been fingerprinted. The routine 400 then continues at decision block 418, where a determination may be made as to whether the resource utilization signature of the requested task corresponds to a malicious task signature, as described above. In some embodiments, the outcome of a previous determination at decision block 418 may be associated with the user-submitted task and stored as a whitelist or blacklist, and subsequent executions of the routine 400 may instead obtain the whitelist or blacklist and determine whether the user-submitted task is on it.

It will be understood that FIG. 4 is provided for purposes of example, and that many variations on the depicted interactions are within the scope of the present disclosure. For example, at block 412 the generated signature may be compared to malicious task signatures only, and the determinations at decision blocks 414 and 418 may be combined.

As a further example, block 410 may be carried out after the determination at decision block 414, and the newly generated resource utilization signature may only be stored if it does not correspond to an existing signature. FIG. 4 is thus understood to be illustrative and not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for detecting execution of malicious tasks in an on-demand code execution system, the system comprising:
   a data store configured to store computer-executable instructions; and
   a processor in communication with the data store, wherein the computer-executable instructions, when executed by the processor, configure the processor to perform operations including:
      receiving a request to execute a user-submitted task on an on-demand code execution system, wherein the user-submitted task is associated with a user account of the on-demand code execution system;
      monitoring utilization of computing resources during execution of the user-submitted task;
      generating, based at least in part on the monitored utilization of the computing resources during the execution of the user-submitted task, a resource utilization signature for the user-submitted task, wherein the resource utilization signature is generated without reference to code associated with the user-submitted task;
      obtaining, a plurality of resource utilization signatures for previously executed tasks, wherein at least one resource utilization signature of the plurality of resource utilization signatures is associated with a malicious task;

determining that the resource utilization signature for the user-submitted task corresponds to the at least one resource utilization signature associated with the malicious task;

in response to the determination, generating a notification regarding the resource utilization signature for the user-submitted task; and transmitting the notification to a user computing device associated with the user account.

2. The system of claim 1, wherein generating the resource utilization signature for the user-submitted task comprises generating a locality sensitive hash value based at least in part on the monitored utilization of the computing resources during the execution of the user-submitted task.

3. The system of claim 1, wherein the computing resources monitored during execution of the user-submitted task comprise one or more of a processor, memory, network, or data store.

4. The system of claim 1, wherein monitoring the utilization of computing resources during execution of the user-submitted task comprises one or more of monitoring an amount of a computing resource that is being utilized at one or more times, monitoring a rate at which the computing resource is utilized during one or more time intervals, or monitoring a percentage of utilization of the computing resource at one or more times.

5. The system of claim 1 comprising further computer-executable instructions that, when executed by the processor, configure the processor to perform further operations including:

receiving a second request to execute the user-submitted task on the on-demand code executing system; and based at least in part on the determination that the resource utilization signature for the user-submitted task corresponds to the resource utilization signature associated with the malicious task, denying the second request.

6. A computer-implemented method comprising:

as implemented by one or more computing devices configured with specific computer-executable instructions, monitoring utilization of computing resources during execution of a user-submitted task on an on-demand code execution system;

generating, based at least in part on the monitored utilization of the computing resources during the execution of the user-submitted task, a resource utilization signature for the user-submitted task, wherein the resource utilization signature is generated without reference to code associated with the user-submitted task;

determining that the resource utilization signature for the user-submitted task corresponds to a resource utilization signature for a malicious task; and notifying an account associated with the user-submitted task that the resource utilization signature for the user-submitted task corresponds to the resource utilization signature for the malicious task.

7. The computer-implemented method of claim 6, wherein the resource utilization signature for the malicious task is generated based at least in part on monitored utilization of computing resources during execution of a malware task in a controlled environment.

8. The computer-implemented method of claim 6, wherein the resource utilization signature for the user-submitted task comprises one or more of a locality sensitive hash value, vector, or numerical score.

9. The computer-implemented method of claim 6 further comprising:

receiving a first request to execute the user-submitted task on the on-demand code execution system; and determining that the user-submitted task has not previously been executed by the on-demand code execution system, wherein monitoring the utilization of computing resources and generating the resource utilization signature are in response to determining that the user-submitted task has not previously been executed by the on-demand code execution system.

10. The computer-implemented method of claim 9 further comprising:

after receiving the first request, receiving a second request to execute the user-submitted task on the on-demand code execution system;

determining that the user-submitted task was previously executed on the on-demand code execution system; and notifying an account associated with the second request that the resource utilization signature for the user-submitted task corresponds to the resource utilization signature for the malicious task.

11. The computer-implemented method of claim 10, wherein determining that the user-submitted task was previously executed on the on-demand code execution system comprises obtaining the resource utilization signature for the user-submitted task from a data store.

12. The computer-implemented method of claim 6 further comprising storing the resource utilization signature for the user-submitted task in a data store.

13. The computer-implemented method of claim 6, wherein monitoring the utilization of computing resources during execution of the user-submitted task comprises one or more of monitoring processor utilization, memory utilization, memory throughput, network throughput, data store utilization, or data store throughput.

14. The computer-implemented method of claim 6, wherein the resource utilization signature for the malicious task comprises a numeric value, and wherein determining that the resource utilization signature for the user-submitted task corresponds to the resource utilization signature for the malicious task comprises determining that the resource utilization signature for the user-submitted task is within a predetermined range of the numeric value.

15. A system comprising:

a data store configured to store computer-executable instructions; and a processor in communication with the data store, wherein the computer-executable instructions, when executed by the processor, configure the processor to perform operations including:

generating, based at least in part on monitored utilization of computing resources during execution of a user-submitted task on an on-demand code execution system, a resource utilization signature for the user-submitted task, wherein the resource utilization signature is generated without reference to code associated with the user-submitted task;

determining that the resource utilization signature for the user-submitted task corresponds to a resource utilization signature for a malicious task; and notifying an account associated with the user-submitted task that the resource utilization signature for the user-submitted task corresponds to the resource utilization signature for the malicious task.

16. The system of claim 15, wherein the data store is configured to store further computer-executable instructions, that, when executed by the processor, configure the processor to perform further operations including:
monitoring the utilization of the computing resources during the execution of the user-submitted task.

17. The system of claim 16, wherein determining that the resource utilization signature for the user-submitted task corresponds to a malicious task resource utilization signature comprises:
determining a confidence level that the resource utilization signature for the user-submitted task corresponds to the resource utilization signature for the malicious task; and determining that the confidence level satisfies a criterion.

18. The system of claim 15, wherein the computing resources utilized during execution of the user-submitted task are virtual computing resources associated with an execution environment for the user-submitted task.

19. The system of claim 15, wherein notifying the account associated with the user-submitted task comprises prompting a user to indicate whether to proceed with executing the user-submitted task.

* * * * *